United States Patent [19]

Neefe

[11] Patent Number: 4,534,915
[45] Date of Patent: Aug. 13, 1985

[54] METHOD OF CONTROLLING THE ULTRAVIOLET POLYMERIZATION OF SPIN CAST LENSES

[76] Inventor: Charles W. Neefe, 811 Scurry St., Box 429, Big Spring, Tex. 79720

[21] Appl. No.: 642,114

[22] Filed: Aug. 17, 1984

Related U.S. Application Data

[63] Continuation-in-part of Ser. No. 506,873, Jul. 5, 1983, abandoned, which is a continuation-in-part of Ser. No. 417,641, Sep. 9, 1982, Pat. No. 4,416,837.

[51] Int. Cl.³ .............................................. B29D 11/00
[52] U.S. Cl. ..................................... 264/1.4; 264/2.1; 264/22; 264/25; 425/174.4
[58] Field of Search .................... 425/808, 174.4; 264/1.4, 2.1, 22, 25

[56] References Cited

U.S. PATENT DOCUMENTS

| | | | |
|---|---|---|---|
| 2,524,862 | 10/1950 | White | 425/808 |
| 2,525,664 | 10/1950 | Gadsby et al. | 425/808 |
| 3,660,545 | 5/1972 | Wichterle | 264/1.4 |
| 4,113,224 | 9/1978 | Clark et al. | 264/1.4 |
| 4,166,088 | 8/1979 | Neefe | 425/808 |
| 4,382,902 | 5/1983 | Feurer | 264/1.4 |

Primary Examiner—James Lowe

[57] ABSTRACT

A method of controlling the polymerization of spin cast hydrogel contact lenses by controlling the shape of the ultraviolet light beam across the rotating surface of the spin cast lens. To provide polymerization which progresses smoothly from the center to edge of the rotating lens.

7 Claims, 4 Drawing Figures

METHOD OF CONTROLLING THE ULTRAVIOLET POLYMERIZATION OF SPIN CAST LENSES

This is a continuation-in-part of Ser. No. 506,873, filed July 5, 1983, now abandoned, entitled; "Improvements in Spin Casting Hydrogel Lenses" which is a continuation-in-part of Ser. No. 417,641 entitled; "Simplified Improvements in Spin Casting" filed Sept. 9, 1982, now U.S. Pat. No. 4,416,837.

PRIOR ART

The art of spin casting contact lenses has been in use for nineteen years. The principal value of spin casting is its low labor cost and high production. The disadvantages are the lenses are not spherical and the aspheric surface is of a shape that increases spherical aberration when in place on the eye. The exact shape of a spin cast surface is most difficult to describe due to its being formed by several forces including centrifugal force, surface tension, viscosity of the liquid and radius of the concave mold. Also the lens monomer undergoes changes during polymerization. These changes include shrinkage, increase in viscosity, gelation, exotherm, and solidification. Spherical and aspheric lenses have been used to focus energy toward the center of lenses during polymerization, examples are U.S. Pat. No. 4,166,088 which has a spherical lens on the mold surface. Opaque circular masks have been employed to limit the radiation to the central lens area. It is desirable to start polymerization at the center and proceed toward the edge. In spin casting the reverse has been true. The edge of the concave lens surface being slightly nearer the ultraviolet light source polymerizes before the central area.

SUBJECT OF THE INVENTION

A method has been employed whereby the advantages of spin casting may be employed to produce lenses with control over the polymerization by using ultraviolet radiation of a selected wavelength and focusing the ultraviolet light in a straight line across the rotating lens surface. Multiple lenses may be placed in the line of light simultaneously.

IN THE DRAWINGS

THE METHOD IS AS FOLLOWS

Figure 1:
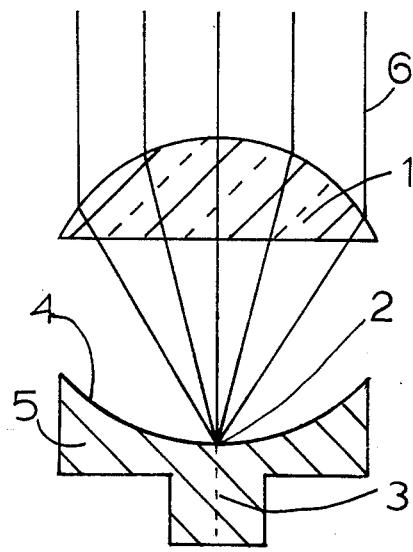
FIG. 1 shows the spin cast lens and the cylinder lens in section.

A light source of the wavelength required for the selected catalyst is provided. Mercury vapor lamps of low, medium or high pressure types are available that provide the required wavelength to activate polymerization initiations. The following are examples of ultraviolet polymerization initiations:

Methyldiethonolamine
Benzoin
Azobisiobulyronitrile
Benzoin Methyl Ether
Azobis 2 methylpropionitrile
Butyl ether of benzoin
Benzophenone
Benzathrone The ultraviolet light source is mounted above a line of lenses to be spin cast. Lines of one to 200 lenses may be polymerized at one time from a single light source. Multiple parallel lines of lenses have been assembled to function from a single light source through multiple lenses of the Maddox rod, cylinder or Fresnel type. These lenses have no refraction through one axis and positive convergence refraction through the axis 90° removed from the zero refractive axis. This provides a straight line image from a single light source. A narrow high energy line of actinic light can thus be provided.

The cylinder condensing lenses are positioned over the concave lens molds whereby the line of actinic light passes through the center of rotation of the spin cast mold. A cylinder condensing lens may be made by cutting a length of polymethacrylate rod lengthwise through its center and polishing the flat surface. The condensing lens, convex or fresnel must be made from a material which is transparent to ultraviolet wavelengths. Polymethacrylate is transparent to the required wavelengths and is readily available in many shapes. Methyl pentane and quarts glass are also transparent to the required wavelengths. Ultraviolet fillers which block infrared and visible light and pass only ultraviolet may be used to eliminate the heat from the light source.

A light source such as a cylinderical ultraviolet emitting tube will provide a straight line of ultraviolet energy when the length of the tube is parallel to a narrow slit in an opaque mask.

The band of ultraviolet light 0.5 mm to 5.0 mm in width across the surface of the rotating lens provides continuous actinic light energy to the center of the lens and progressively less ultraviolet energy toward the edge of the rotating lens. The time a given point is exposed to the action of the actinic light depends on its position relative to the lens center of the rotating lens. A point nearer the center will receive more light than a point toward the periphery. This produces smooth polymerization proceeding from the center to the edge. The central optics are of prime concern. Good optics, obtained first at the center will extend to the lens edge. Shrinkage of polymerization produces no adverse optical effect if the solid is at the center surrounded by a rotating liquid. When the edge is allowed to polymerize first forming a solid periphery with a rotating liquid center then the shrinkage of polymerization must draw material from the center liquid pool resulting in less than ideal optical quality at the lens center. Internal stress is also established at the lens center which will manifest itself as a distortion of curvature upon hydration to form a soft lens.

THE METHOD IS CARRIED OUT AS FOLLOWS

Examples of monomer formulations:

| (1) | Ethylene glycol monomethacrylate | 98.75% |
| --- | --- | --- |
|  | Diethylene glycol monomethacrylate | 1.0% |
|  | Benzoin Methyl Ether | .25% |
|  | Amounts given by weight |  |
| (2) | Vinyl Pyrrolidinone | 70% |
|  | Methyl Methacrylate | 25.5% |
|  | Allyl Methacrylate | 2% |
|  | Ethylene Dimethacrylate | 2% |
|  | Azobisiobulyronitrile | 0.5% |
|  | Amounts given by weight |  |
| (3) | Methyl Methacrylate | 82.5% |
|  | Methacrylic Acid | 17% |

-continued

| | |
|---|---|
| Azobisiobulyronitrile | .5% |
| Amounts given by weight | |

Figure 2:
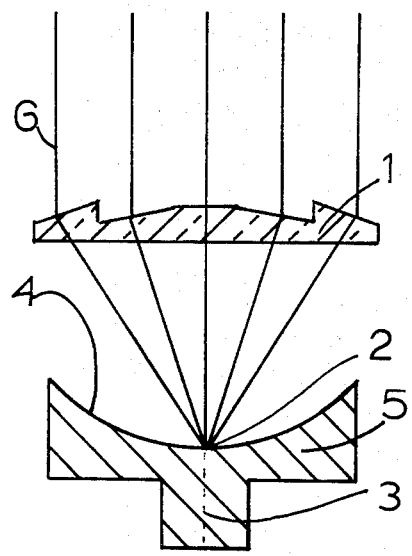
FIG. 2 shows the spin cast lens and a fresnel lens in section.
Figure 3:
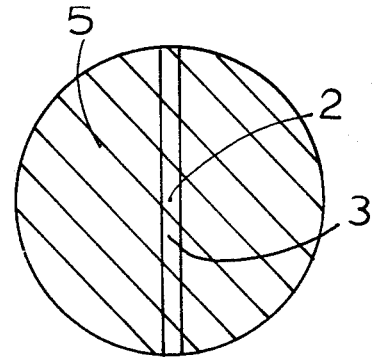
FIG. 3 shows the lens with the line of ultraviolet light passing through its center.
Figure 4:
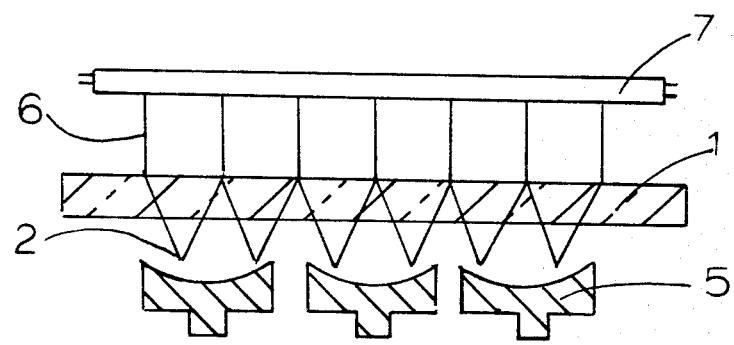
FIG. 4 shows multiple spin cast lenses and the line of ultraviolet light.

A convex positive refractive power cylinder lens 1 FIG. 1 or a fresnel cylinder refractive power lens 1 FIG. 2 is placed at the lens focal length from the lens surface 2 FIGS. 1 and 2. The light 6, FIGS. 1, 2 and 4 from the light source 7 FIG. 4 is focused to a straight line 3 FIG. 3 across the lens surface. The cylinder lens is positioned to provide a narrow line of light 3 FIG. 3 across the lens passing through the center of rotation of the lens 2 FIG. 3. The liquid lens monomer 4 FIGS. 1 and 2 is placed in the concave lens mold 5 FIGS. 1 and 2. The lens liquid monomer and the lens mold 5 FIGS. 1 and 2 are rotated about the optical axis of the lens 3 FIGS. 1 and 2. The line of light provided by the cylinder lens 1 FIGS. 1, 2 and 4 provides a line of light passing through the center of rotation of the lenses 3 FIGS. 1 and 2. The lenses are rotated about the central axis 3 FIGS. 1 and 2. The center portion of the lens is exposed to the ultraviolet light at all times, the area adjacent to the center receives slightly less radiation due to passing from the line of ultraviolet light while rotating. The area further from the center receive progressively less radiation based on their greater distance from the center of rotation.

The lenses 1 FIGS. 1, 2 and 4 must be made of materials which are transparent to the wavelengths required to initiate the polymerization. Polymethylmethacrylate is suitable for use with ultraviolet radiation.

Infrared transparent lenses may be used with infrared light sources as a source of heat. Polymerization initiators which react to heat must be added to the monomer mixtures when infrared is used.

Examples of heat sensitive catalysts are:
Benzoyl Peroxide
2,2'-Azobis[2 methylpropionitrile]

The effects of monomer changes such as shrinkage, evaporation, gelation, internal stress and solidification have a reduced effect on the optically critical central area if polymerization occurs first in this most critical area. The rotating lens passing through a straight line of radiation centered on the lens provides the required rate and progression of polymerization to fulfill the requirements.

When this procedure is followed the central optical area will possess less internal stress, have smoother surface contours and improved optical quality. The periphery of the lens liquid and the last to gel and polymerize is free to migrate inward as shrinkage requires and less stress is present throughout the lens.

Various modifications, of course, can be made without departing from the spirit of this invention or the scope of the appended claims. It is understood that many variations are obtainable which will yield materials disclosed herein. The constants set forth in this disclosure are given as examples and are in no way final or binding.

I claim:

1. A method of polymerizing a spin cast lens in a rotating concave mold by providing a band of actinic light extending across the rotating lens monomer and passing through the center of the lens rotation whereby the rotating lens monomer near the center of rotation will receive more energy from the actinic light and polymerize before the rotating monomer further from the lens center of rotation.

2. A method as in claim 1 wherein a lens focuses the actinic light to form a band across the lens.

3. A method as in claim 1 wherein the band of actinic light passes through the center of a plurality of rotating lenses.

4. A method of controlling the polymerization of spin cast lenses by the steps of providing an open top concave lens mold, placing a selected liquid lens monomer with an ultraviolet sensitive polymerization initiator in the concave lens mold, rotating the concave lens mold and the selected liquid lens monomer around the optical axis of the spin cast lens, a stationary line of ultraviolet light 0.5 millimeter to 5.0 millimeter in width extends across the lens passing through the center of the rotating liquid lens, in the presence of the ultraviolet light, the liquid lens monomer polymerizes at the lens center and polymerization proceeds outward to the lens edge to provide a solid spin cast lens.

5. A method as in claim 4 wherein a lens focuses the ultraviolet light to form a line across the lens.

6. A method as in claim 4 wherein a lens focuses the radiant energy to a line across the rotating lens.

7. A method as in claim 4 wherein the line of ultraviolet light passes through the center of a plurality of rotating lenses.

* * * * *